(12) United States Patent
Niitsu et al.

(10) Patent No.: US 7,986,985 B2
(45) Date of Patent: Jul. 26, 2011

(54) PORTABLE ELECTRONIC DEVICE WITH A SLIDING MECHANISM FOR A COMPONENT THEREOF

(75) Inventors: Hirokazu Niitsu, Tachikawa (JP); Masaki Uesugi, Inagi (JP); Yuuichi Oota, Higashiyamoto (JP); Motoyuki Tanaka, Hino (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 571 days.

(21) Appl. No.: 12/148,158

(22) Filed: Apr. 16, 2008

(65) Prior Publication Data

US 2008/0261666 A1  Oct. 23, 2008

(30) Foreign Application Priority Data

Apr. 17, 2007 (JP) ................... 2007-108212

(51) Int. Cl.
*H04W 88/02* (2009.01)
*H04B 1/38* (2006.01)
(52) U.S. Cl. ............ 455/575.4; 455/575.3; 455/566
(58) Field of Classification Search .......... None
See application file for complete search history.

(56) References Cited

U.S. PATENT DOCUMENTS

| | | | | |
|---|---|---|---|---|
| 6,681,124 B2 * | 1/2004 | Prior et al. | ............ | 455/575.1 X |
| 7,110,797 B2 * | 9/2006 | Soejima | ............ | 455/575.1 |
| 7,574,241 B2 * | 8/2009 | Ahn et al. | ............ | 455/575.1 |
| 2003/0206394 A1 * | 11/2003 | Ossia | ............ | 361/680 |
| 2005/0124394 A1 * | 6/2005 | Kim et al. | ............ | 455/575.3 |
| 2005/0248501 A1 * | 11/2005 | Kim | ............ | 345/1.1 |
| 2006/0114646 A1 | 6/2006 | Koibuchi et al. | | |
| 2006/0229115 A1 * | 10/2006 | Puranen | ............ | 455/575.1 |
| 2006/0279942 A1 | 12/2006 | Yasuda | | |
| 2007/0146977 A1 * | 6/2007 | Choi | ............ | 361/680 |
| 2007/0167197 A1 | 7/2007 | Fuke et al. | | |
| 2007/0227873 A1 | 10/2007 | Kawasaki et al. | | |

FOREIGN PATENT DOCUMENTS

| | | |
|---|---|---|
| CN | 101036100 | 9/2007 |
| JP | 2001-016635 | 1/2001 |
| JP | 2002-171189 | 6/2002 |
| JP | 2002-318640 | 10/2002 |

(Continued)

OTHER PUBLICATIONS

Korean Office Action dated Jan. 28, 2010 issued in the Korean counterpart and partial English translation of the Korean Office Action.

*Primary Examiner* — Philip J Sobutka
(74) *Attorney, Agent, or Firm* — Cohen Pontani Lieberman & Pavane LLP

(57) ABSTRACT

A cellular phone device has an operation-unit casing, a sliding casing which is coupled to the operation-unit casing with the front face of the sliding casing facing the rear face of the operation-unit casing, and which slides with respect to the operation-unit casing in a direction parallel to the rear face of the operation-unit casing, and a direction input device provided on the rear face of the operation-unit casing. The sliding casing slides with respect to the operation-unit casing between a state where the direction input device is covered by the sliding casing and a state where a covering of the direction input device by the sliding casing is released.

2 Claims, 14 Drawing Sheets

FOREIGN PATENT DOCUMENTS

| | | |
|---|---|---|
| JP | 2003-298699 | 10/2003 |
| JP | 2004-120333 | 4/2004 |
| JP | 2005-109970 | 4/2005 |
| JP | 2005-141541 | 6/2005 |
| JP | 2006-099230 | 4/2006 |
| JP | 2006-178924 | 7/2006 |
| JP | 2006-189917 | 7/2006 |
| JP | 2006-287643 | 10/2006 |
| KR | 2006-0093163 | 8/2006 |
| KR | 2007-0001447 | 1/2007 |

* cited by examiner

PORTABLE ELECTRONIC DEVICE WITH A SLIDING MECHANISM FOR A COMPONENT THEREOF

BACKGROUND OF THE INVENTION

1. Field of the Invention

The present invention relates to an electronic device. More particularly, the present invention relates to a sliding type electronic device.

2. Description of the Related Art

Recently, portable electronic devices having a wireless communication function, like cellular phone devices are widely used. There are various types of portable electronic devices: a so-called straight type; a foldable type; and a sliding type. A foldable type portable electronic device has a display-unit casing provided with a display screen and an operation-unit casing provided with plural keys, both casings hinged together. A sliding portable electronic device has a display-unit casing and an operation-unit casing, both casings coupled together via a sliding mechanism, as disclosed in, for example, Unexamined Japanese Patent Application KOKAI Publication No. 2006-178924. As the display-unit casing slides, keys of the operation-unit casing appear or are hidden. A straight type portable electronic device has one casing, as disclosed in, for example, Unexamined Japanese Patent Application KOKAI Publication No. 2002-318640.

A portable electronic device further has a pointing device for moving a cursor, a pointer, or the like displayed on the display unit of the portable electronic device. A possible pointing device is a so-called touch pad, a joystick, a cross key, or a track ball. The straight type portable electronic device disclosed in Unexamined Japanese Patent Application KOKAI Publication No. 2002-318640 has a touch pad provided on the rear face of the casing.

Regarding the sliding type portable electronic devices, the area of the front face of the operation-unit casing is limited. Accordingly, it is difficult to provide a pointing device on the front face of the operation-unit casing, in addition to plural keys.

Further, regarding the straight type portable electronic devices, the touch pad is exposed when it is not in use and is not protected in this state.

SUMMARY OF THE INVENTION

It is an object of the invention to provide a sliding type electronic device which can have an input unit even though the area of a front face, where another input unit like a keyboard is disposed, of a casing located behind an operation-unit casing is limited, and can protect another input unit.

To achieve the object, an electronic device of the invention comprises:

a first casing;

a second casing which is coupled to the first casing with the front face of the second casing facing the rear face of the first casing, and which slides with respect to the first casing in a direction parallel to the first casing; and a first input unit provided on the rear face of the first casing, and wherein the second casing slides with respect to the first casing between a state where the first input unit is covered by the second casing and a state where a covering of the first input unit by the second casing is released.

According to the invention, as the second casing is opened/closed with respect to the first casing by sliding the second casing, the first input unit provided on the rear face of the first casing is hidden or exposed by the second casing.

Accordingly, if the second input unit is provided, for example, on the front face of the second casing, the first input unit can be used simultaneously with the second input unit with the first input unit exposed. Moreover, if the display unit is provided, for example, on the front face of the first casing, a user can operate the first input unit on the rear face of the first casing while holding the first casing and the second casing and viewing the display unit. Further, a user can hold the electronic device in his/her hand with natural finger positions, so that the operation of the electronic device is facilitated.

On the other hand, when the first input unit is hidden, the first input unit can be protected. Even though the area of the front face of the second casing is limited, the space of the outside surface of the electronic device can be efficiently used because the first input unit is provided on the rear face of the first casing.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
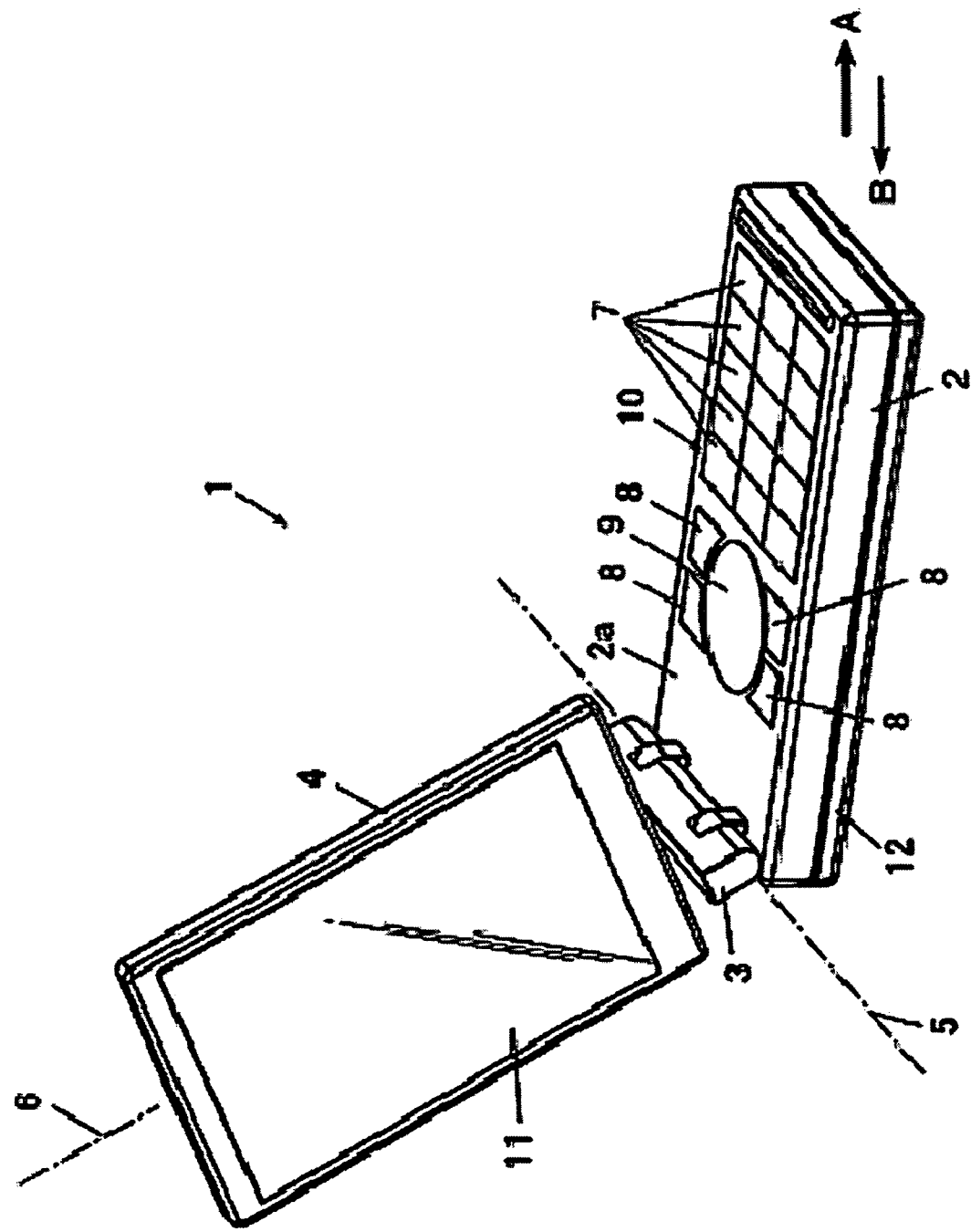
FIG. 1 is a perspective view showing a portable electronic device according to an embodiment of the invention.

An embodiment of the invention will be explained with reference to accompanying drawings. The embodiment discussed below has various limitations technically preferable to embody the invention, but the scope of the invention should not be limited to the following embodiment and examples shown in the drawings.

Figure 2:
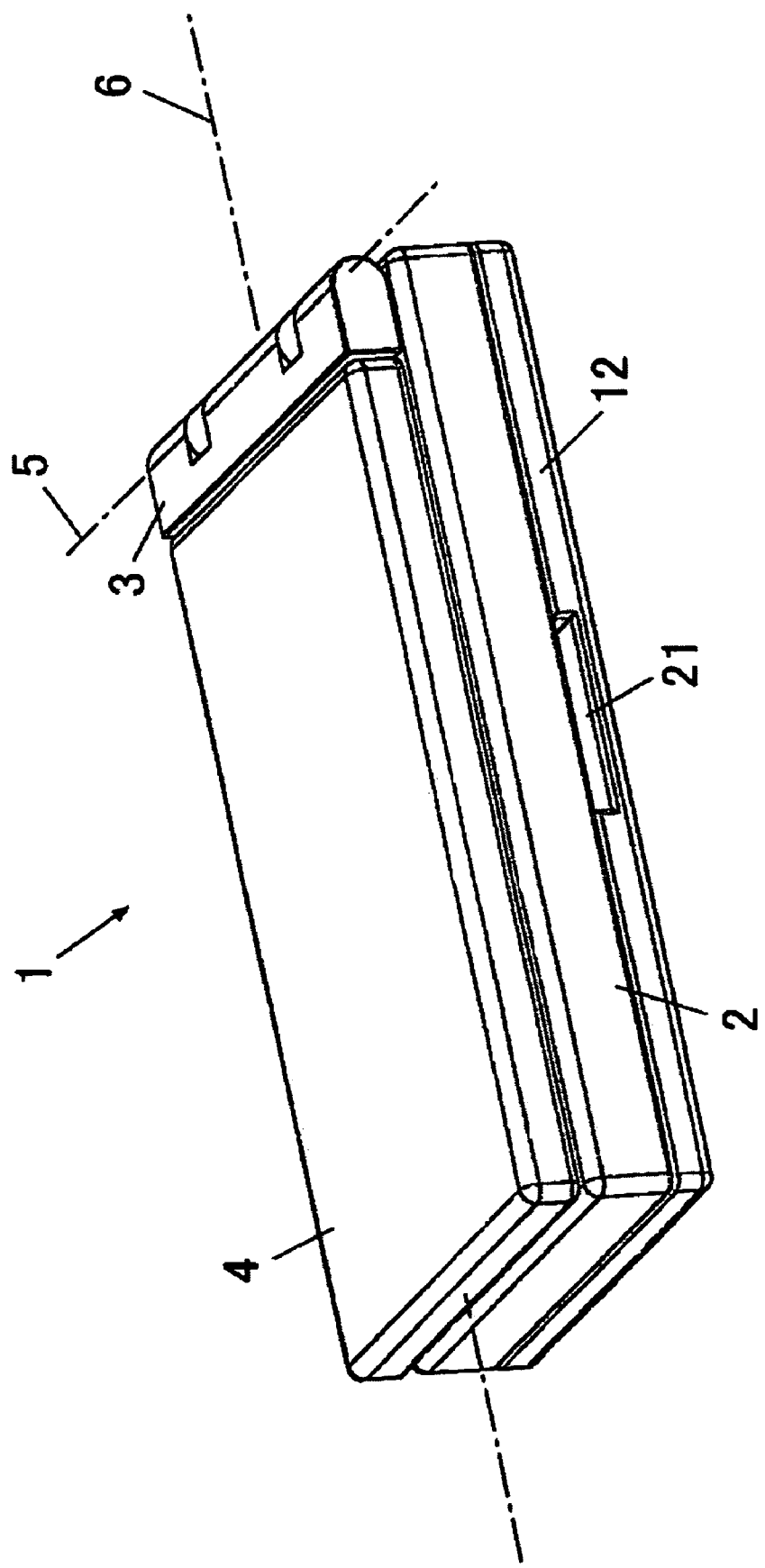
FIG. 2 is a perspective view showing the portable electronic device according to the embodiment of the invention, and is for explaining the state where a display-unit casing is closed.

FIGS. 1 and 2 are perspective views showing a cellular phone device 1.

The cellular phone device 1 has a biaxial hinge 3 which couples an operation-unit casing 2 with a display-unit casing 4. The operation-unit casing 2 corresponds to a first casing, and the display-unit casing 4 corresponds to a third casing.

The operation-unit casing 2 has an operation unit 10 which includes numeral keys 7, function keys 8, a cross key 9, and the like, and which is provided on a front face 2a of the casing 2. In viewing the operation-unit casing 2 from the front face 2a, the operation-unit casing 2 is formed in a rectangular shape. A direction vertical to the front face 2a of the operation-unit casing 2 and a rear face 2b thereof (corresponding to FIG. 3 or the like) is taken as a thickness direction. A longitudinal direction of the rectangular vertical to the thickness direction is taken as a vertical direction. A shorter direction of the rectangular vertical to the vertical direction and the thickness direction is taken as a horizontal direction. Therefore, the operation-unit casing 2 is in its size longer in the vertical direction, the horizontal direction, and the thickness direction, in this order.

The display-unit casing 4 has a display unit 11 having a liquid crystal display panel or an organic EL display panel which is provided on the front face of the casing 4. In viewing the display-unit casing 4 from the front, the display-unit casing 4 is formed in a rectangular shape.

The operation-unit casing 2 and the biaxial hinge 3 are rotatable around an axial line 5 which is parallel to the front face 2a of the operation-unit casing 2 and is parallel to the horizontal direction of the operation-unit casing 2. The biaxial hinge 3 and the display-unit casing 4 are rotatable around an axial line 6 which is orthogonal to the axial line 5. The operation-unit casing 2 and the display-unit casing 4 are coupled together by the biaxial hinge 3 in this manner. Accordingly, the front and rear of the display-unit casing 4 turn over around the axial line 6. The display-unit casing 4 opens and closes around the axial line 5 with respect to the operation-unit casing 2.

Hereinafter, a state where the display-unit casing 4 is closed with respect to the operation-unit casing 2 and the display unit 11 faces opposite to the operation-unit casing 2 is called a view-style state. Further, a state where the display-unit casing 4 is opened with respect to the operation-unit casing 2 and the display unit 11 faces the front face of the operation-unit casing 2 relative to the circumferential direction of the axial line 5 is called an open state.

A front/rear sensor 31 (see, FIG. 9) is provided inside either one of or both of the operation-unit casing 2 and the display-unit casing 4. The front/rear sensor 31 detects that the display-unit casing 4 is in the open state and detects that the display-unit casing 4 is in the view-style state.

As shown in FIGS. 1 to 6, the operation-unit casing 2 is coupled with a sliding casing 12 via a sliding mechanism with the rear face 2b of the operation-unit casing 2 facing a front face 12a of the sliding casing 12. The sliding casing 12 is in its size longer in the vertical direction, the horizontal direction, and the thickness direction, in this order. Note that the sliding casing 12 corresponds to a second casing.

The sliding mechanism makes the sliding casing 12 slidable in a horizontal direction with respect to the operation-unit casing 2. Specifically, guide units 13 and 14 parallel to the horizontal direction of the operation-unit casing 2 and formed in a groove-like shape are provided at both end portions of the rear face 2b of the operation-unit casing 2 in the vertical direction. Sliders are provided at both end portions of the front face 12a of the sliding casing 12 in the vertical direction. The sliders are slidably linked to the guide units 13 and 14, respectively. The sliding range of the sliding casing 12 is from a state where the operation-unit casing 2 entirely overlaps the sliding casing 12 (hereinafter called a key close state) as viewed from the front, and to a state where the sliding casing 12 partially overlaps the left portion of the operation-unit casing 2 and is partially out from the outer edge of the operation-unit casing 2 to the left (hereinafter, a key open state). Note that FIGS. 1 and 2 show the key close state, and FIGS. 3 to 6 show the key open state.

Figure 5:
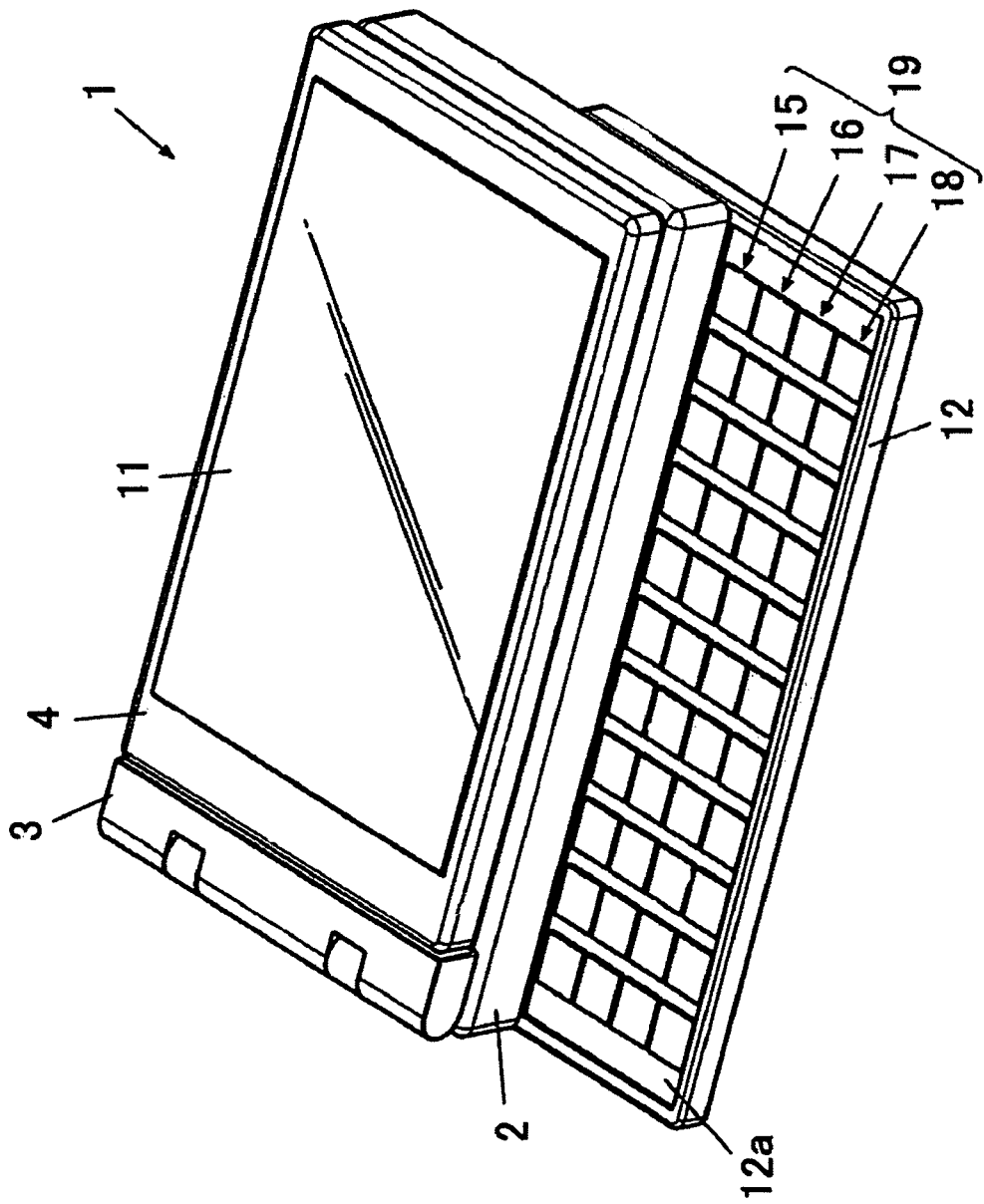
FIG. 5 is a perspective view showing the portable electronic device according to the embodiment of the invention, and is for explaining a state where the sliding casing is slid to expose a keyboard.
Figure 6:
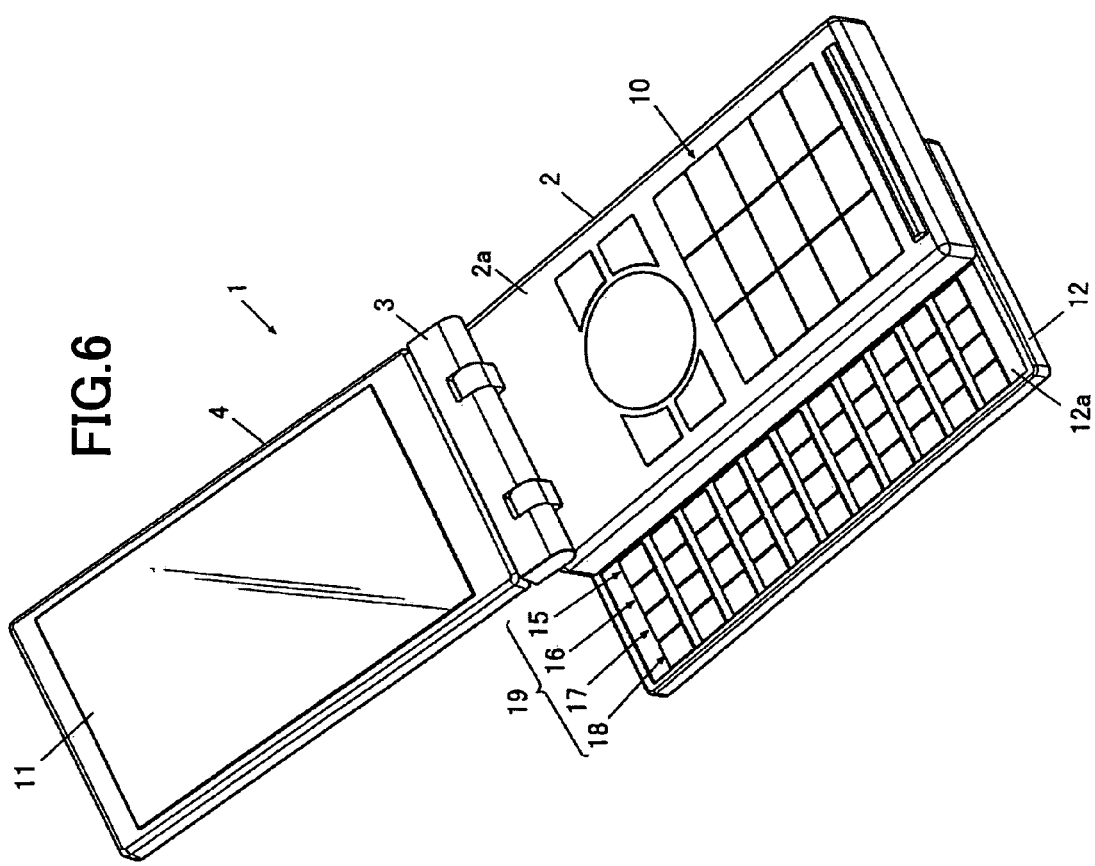
FIG. 6 is a perspective view showing the portable electronic device according to the embodiment of the invention, and is for explaining a state where the display-unit casing is opened, the sliding casing is slid, and the keyboard is exposed.
Figure 7:
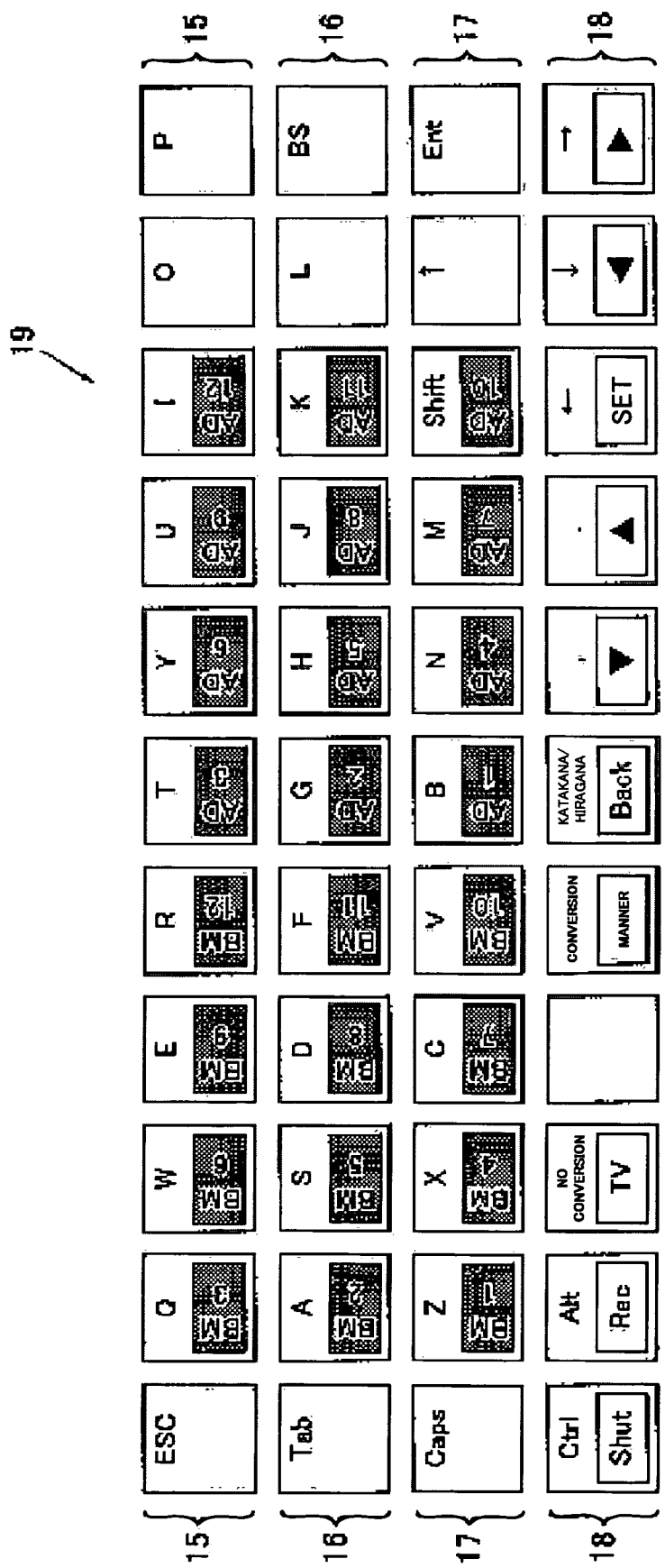
FIG. 7 is a diagram for explaining the allocation of each key of the keyboard.

As shown in FIGS. 5 and 6, the sliding casing 12 has a keyboard 19 provided on the front face 12a and having plural keys. The keyboard 19 corresponds to a second input unit. FIG. 7 is a plan view showing the key arrangement of the keyboard 19. As shown in FIGS. 5 to 7, the keyboard 19 comprises key columns 15 to 18 of four columns. A plurality of keys are arranged in the vertical direction of the sliding casing 12 in each key column 15 to 18. It is supposed that an explanation will be given as the key column 15 located at the most right side serving as a first column, and as the key column 18 located at the most left side serving as a fourth column.

Figure 8:
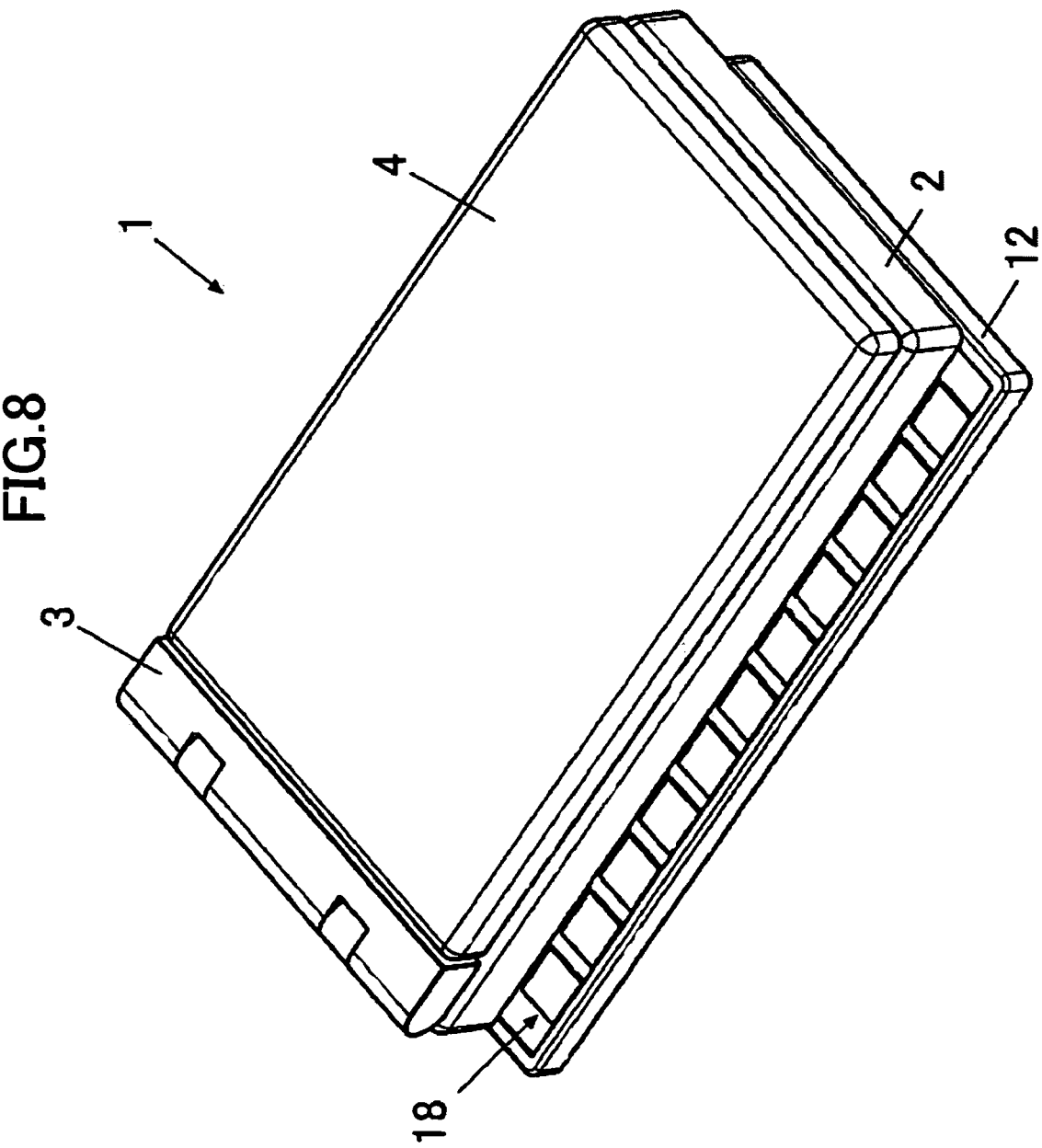
FIG. 8 is a perspective view showing the portable electronic device according to the embodiment of the invention, and is for explaining a state where the sliding casing is slid, and the keyboard is half-opened.

When the sliding casing 12 and the operation-unit casing 2 are in the key close state, all keys of the keyboard 19 are covered by the operation-unit casing 2. As the sliding casing 12 and the operation-unit casing 2 are slid to be in the key open state from the key close state, the key column 18 of the fourth column, the key column 17 of the third column, the key column 16 of the second column, and the key column 15 of the first column are exposed in this order. When the sliding casing 12 and the operation-unit casing 2 are in the key open state, the covering of the keyboard 19 by the operation-unit casing 2 is released, and all keys of the keyboard 19 are exposed. Hereinafter, a state where only the key column 18 of the fourth column is exposed as shown in FIG. 8 is called a half-open state.

The sliding casing 12 or the operation-unit casing 2 is provided with a stopper. The stopper poses the sliding casing 12 and the operation-unit casing 2 in the key open state, the half-open state, and the key close state, respectively. The individual states maintained by the stopper are releasable. For example, in a case where an elastic latching piece is provided in the guide 13, and when the sliding casing 12 and the operation-unit casing 2 are in the key open state, the elastic latching piece latches the slider, and when the elastic latching piece elastically deforms, the latching is released. For the half-open state and the key close state, elastic latching pieces for respective states are provided.

An open/close sensor 32 (see, FIG. 9) is provided inside either one of or both of the sliding casing 12 and the operation-unit casing 2. The open/close sensor 32 detects that the sliding casing 12 and the operation-unit casing 2 are in the key open state, detects that the sliding casing 12 and the operation-unit casing 2 are in the key close state, and further detects that the sliding casing 12 and the operation-unit casing 2 are in the half-open state.

Figure 3:
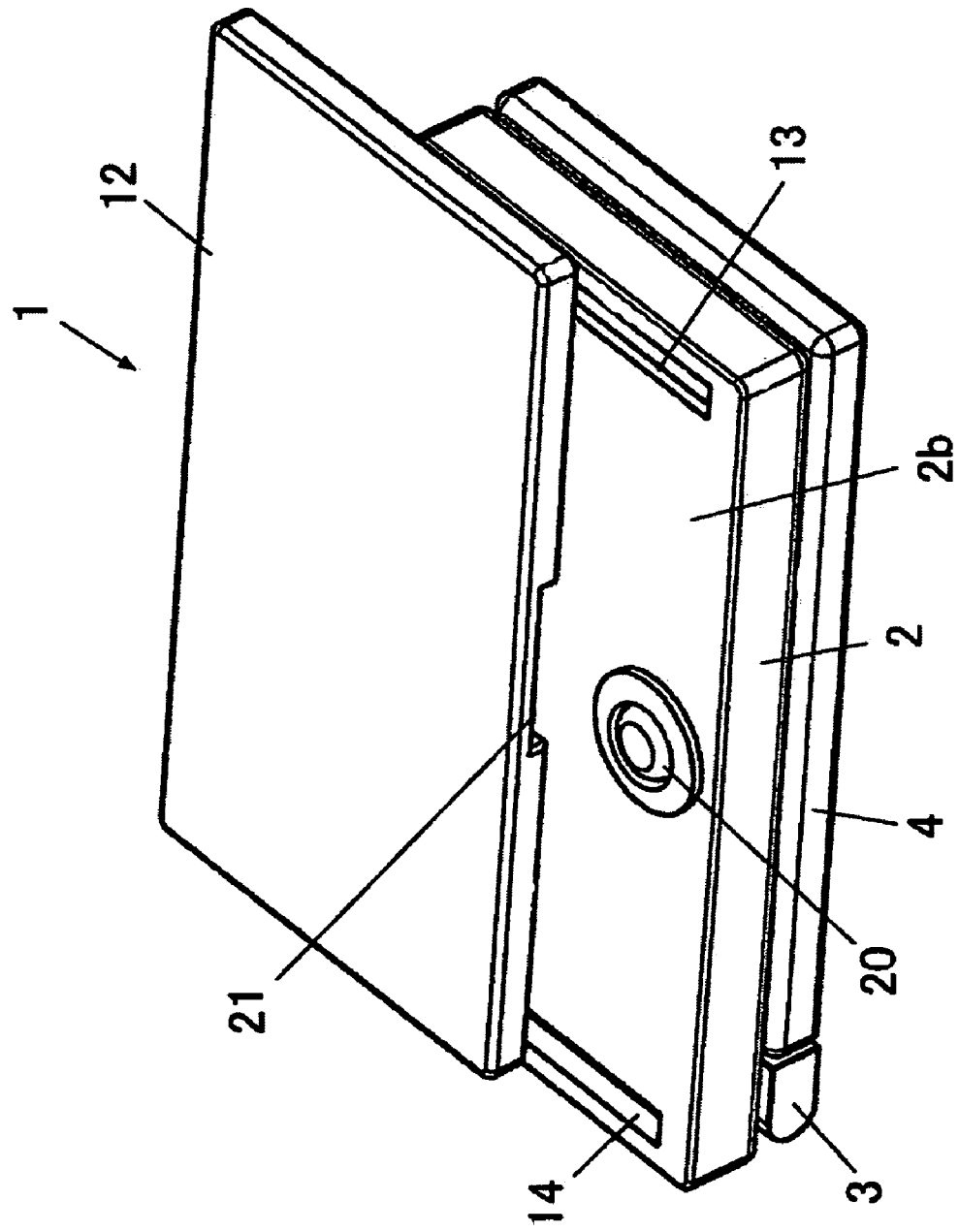
FIG. 3 is a perspective view showing the portable electronic device according to the embodiment, and is for explaining the state where a sliding casing is slid.
Figure 4:
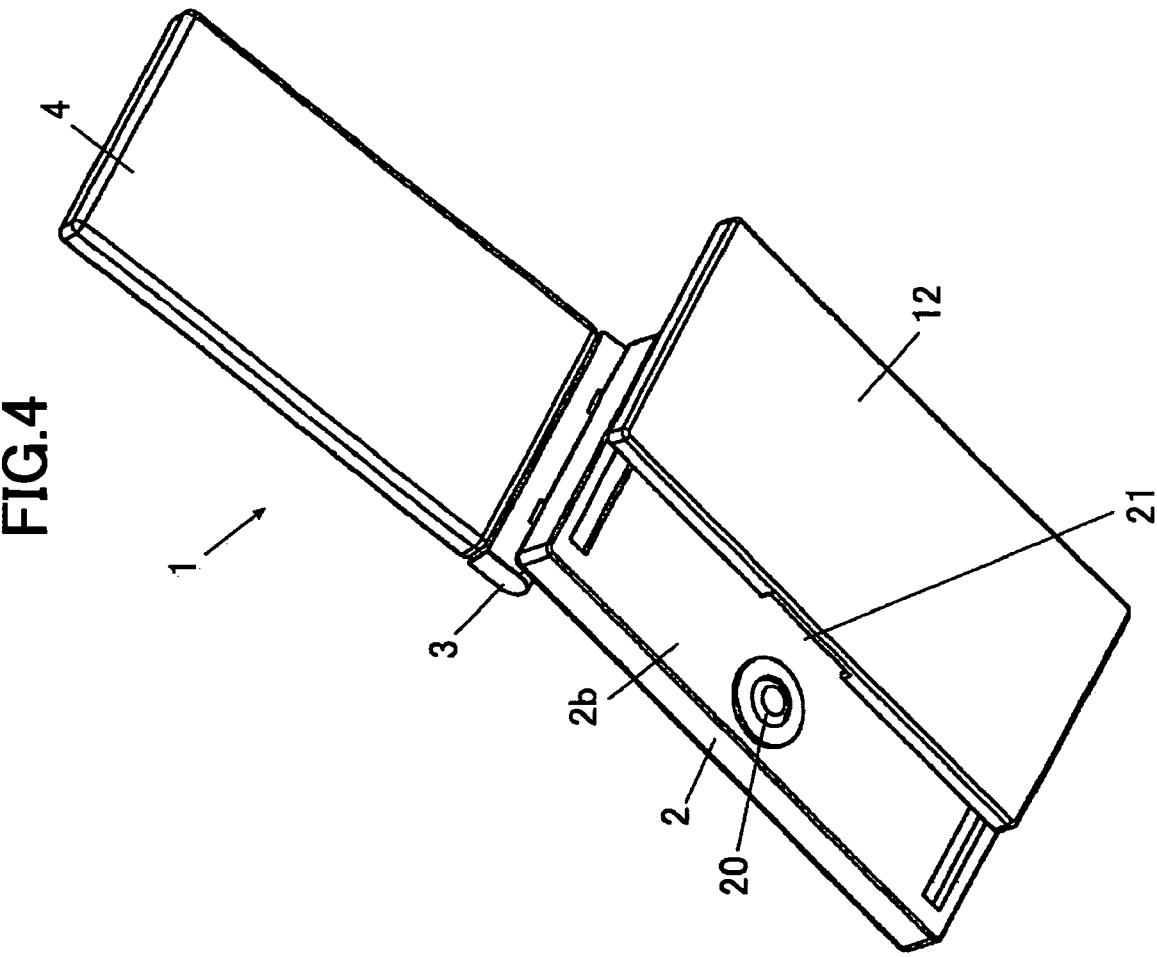
FIG. 4 is a perspective view showing the portable electronic device according to the embodiment of the invention, and is for explaining a state where the display-unit casing is opened and the sliding casing is slid.

As shown in FIGS. 3 and 4, the operation-unit casing 2 has a direction input device 20 provided on the rear face 2b and functioning as a first input unit. The direction input device 20 is a trackball type pointing device. Note that the direction input device 20 may not be a trackball type pointing device, but may also be a plural tactile switch type pointing device (e.g., a cross key), a stick type pointing device (e.g., a joystick), an optical pointing device, a capacitance type pointing device (e.g., a touchpad), and pointing devices of other types.

The position where the direction input device 20 is provided is a center in the vertical direction, and is a side where the sliding casing 12 is closed in the key close state, i.e., the left side as viewed from the rear in the horizontal direction. When the sliding casing 12 and the operation-unit casing 2 are in the key close state, the direction input unit 20 is covered by the sliding casing 12. On the other hand, when the sliding casing 12 and the operation-unit casing 2 are in the key open state, the covering of the direction input unit 20 by the sliding casing 12 is released, and the direction input device 20 is exposed.

As shown in FIGS. 2 to 4, a recess 21 is formed in the front face 12a (see, FIG. 6) of the sliding casing 12, and is located at the right as viewed from the front. When the sliding casing 12 and the operation-unit casing 2 are in the key close state, the direction input device 20 is housed in the recess 21. Because such a recess 21 is formed, the direction input device 20 does not abut the sliding casing 12 when the sliding casing 12 is slid from the key open state to the key close state.

Figure 9:
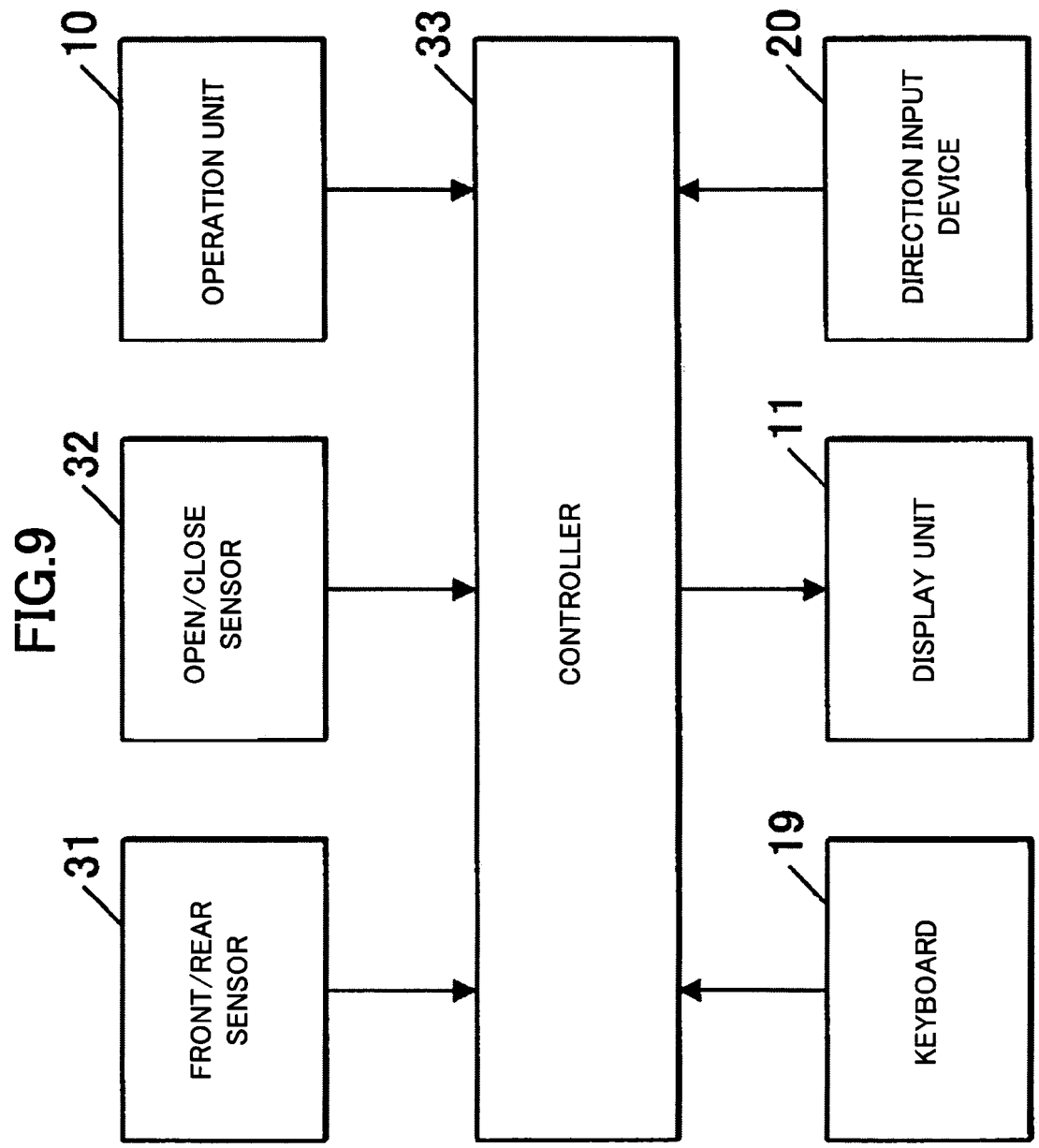
FIG. 9 is a diagram for explaining a controller provided inside an operation-unit casing.

As shown in FIG. 9, a controller 33 including a CPU, a RAM, a ROM, and various drivers is provided inside the operation-unit casing 2. As the direction input device 20 is operated, an operation signal corresponding to the operation content is output from the direction input device 20 to the controller 33. As a key of the operation unit 10 is pressed, a signal corresponding to the pressed key is output from the operation unit 10 to the controller 33. Further, as a key of the keyboard 19 is pressed, a signal corresponding to the pressed key is output from the keyboard 19 to the controller 33.

As the front/rear sensor 31 detects the open state, a signal indicating that state is output from the front/rear sensor 31 to the controller 33. As the front/rear sensor 31 detects the view-style state, a signal indicating that state is output from the front/rear sensor 31 to the controller 33. Further, as the open/close sensor 32 detects the key open state, a signal indicating that state is output from the open/close sensor 32 to the controller 33. As the open/close sensor 32 detects the key close state, a signal indicating that state is output from the open/close sensor 32 to the controller 33. As the open/close sensor 32 detects the half-open state, a signal indicating that state is output from the open/close sensor 32 to the controller 33.

The controller 33 has a function of changing over a control function by a signal input from the keyboard 19 based on detection results of the front/rear sensor 31 and the open/close sensor 32. Specifically, the controller 33 has memory means (e.g., the ROM) for storing plural types of code allocations (e.g., a character, a symbol, a graphic symbol, and a function) to respective keys of the keyboard 19, selection means (e.g., the CPU) for selecting one type of allocations in the plural types of allocations stored in the memory means based on the detection results of the front/rear sensor 31 and the open/close sensor 32, and coding means (e.g., the CPU) for encoding a signal corresponding to a pressed key of the keyboard 19 in accordance with the selected allocation. Those means are realized as the controller 33 executes programs stored in the ROM.

Figure 10:
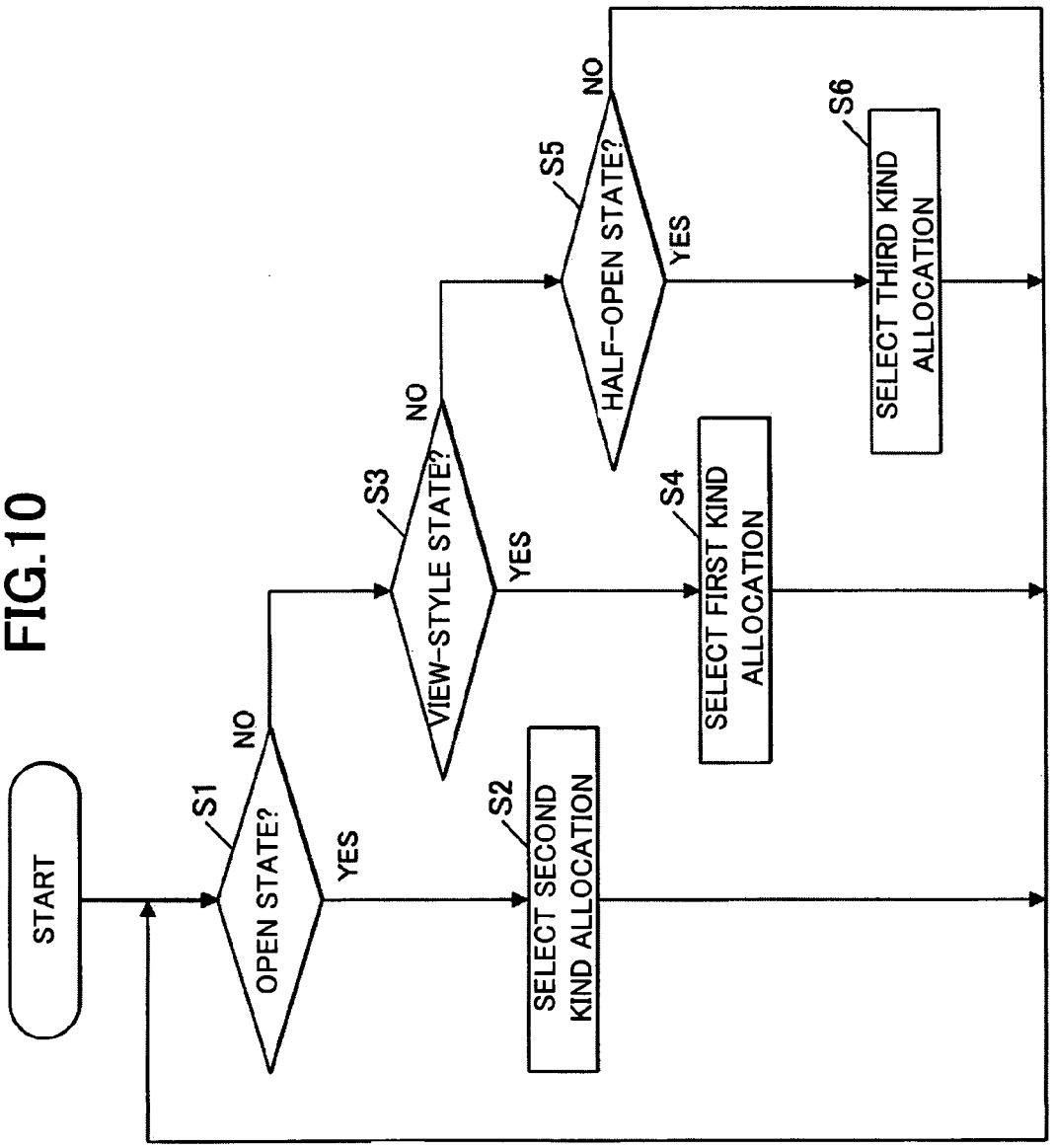
FIG. 10 is a flowchart for explaining the allocation of each key of the keyboard.

Further specifically, as shown in FIG. 7, the allocation of the first kind of each key is a code put at the top of the key top. The allocation of the second kind is a code having a whitened contour put on the bottom of a key top. The allocation of the third kind is a code in a frame put on the bottom of a key top. The controller 33 stores those allocations of three kinds in the ROM. As shown in the flowchart of FIG. 10, in a case where the front/rear sensor 31 outputs a detection signal indicating that it is in the open state (step S1: Yes), the controller 33 selects the second kind allocation (step S2), and enables an input through the direction input device 20. In a case where the front/rear sensor 31 outputs a detection signal indicating that it is in the view-style state (step S3: Yes), the controller 33 selects the first kind allocation (step S4), and enables an input through the direction input device 20. Further, in a case where the front/rear sensor 31 outputs a detection signal indicating that it is in neither open state nor view-style state but the open/close sensor 32 outputs a detection signal indicating that it is in the half-open state (step S5: Yes), the controller 33 selects the third kind allocation (step S6).

Next, an explanation will be given of how to use the cellular phone device 1.

The user closes or opens the display-unit casing 4 with respect to the operation-unit casing 2 through a rotation around the axial line 5. The user turns around the display-unit casing 4 through a rotation around the axial line 6. By such operations, the display-unit casing 4 becomes the open state (see, FIGS. 4 and 6), the view-style state (see, FIG. 5), and other states (e.g., see, FIGS. 1, 2, and 8).

The user slides the sliding casing 12 with respect to the operation-unit casing 2 from side to side. By such an operation, the operation-unit casing 2 and the sliding casing 12 become the key open state (see, FIGS. 3 to 6), the half-open state (see, FIG. 8), and the key close state (see, FIGS. 1 and 2).

When the display-unit casing 4 is in the open state, the controller 33 selects the second kind allocation as explained before. Accordingly, the individual keys of the keyboard 19 function as longitudinally-arranged auxiliary keys. As the user causes the operation-unit casing 2 and the sliding casing 12 to be in the key open state and presses a key of the keyboard 19, the controller 33 encodes a signal corresponding to that key, in accordance with the second kind allocation. Accordingly, the controller 33 operates in accordance with the code.

When the display-unit casing 4 is in the view-style state, the controller 33 selects the first kind allocation as explained above. Accordingly, the keyboard 19 functions as a full keyboard. As the user causes the operation-unit casing 2 and the sliding casing 12 to be in the key open state and presses a key of the keyboard 19, the controller 33 encodes a signal corresponding to that key, in accordance with the first kind allocation. Accordingly, the controller 33 operates in accordance with the code.

When the display-unit casing 4 is in neither view-style state nor open state, but the operation-unit casing 2 and the sliding casing 12 are in the half-open state, the controller 33 selects the third kind allocation as explained above. Accordingly, individual keys of the key column 18 of the fourth column function as side keys. As the user presses a key in the key column 18 of the fourth column, the controller 33 encodes a signal corresponding to that key, in accordance with the third kind allocation. Accordingly, the controller 33 operates in accordance with the code.

In a case where the operation-unit casing 2 and the sliding casing 12 are in the key open state, when the user operates the direction input device 20 with his/her fingers, a signal corresponding to that operation is output to the controller 33, and the controller 33 operates in response to the signal. For example, a pointer displayed on the display unit 11 moves within a screen.

According to the embodiment, when the sliding casing 12 is pulled out to be in the key open state, the direction input device 20 is exposed. Therefore, the direction input device 20 can be used simultaneously with the keyboard 19.

Thumbs of both hands are put on the keyboard 19 or the operation unit 10, while other fingers of both hands are put on the rear face to hold the cellular phone device 1. This enables the user to press a key of the keyboard 19 or the key 7, 8, or 9 of the operation unit 10 with his/her thumbs, and to operate the direction input device 20 with other fingers. Therefore, the user can have natural finger positions.

If the user holds the cellular phone device 1 with one of his/her hands, the user can operate the keyboard 19, the operation unit 10 and the direction input device 20 with the fingers of that hand holding the cellular phone device 1 while operating the keyboard 19 and the operation unit 10 with fingers of another hand not holding the cellular phone device 1.

When the sliding casing 12 is in the key open state and the display-unit casing 4 is in the view-style state, the operation unit 10 is hidden by the display-unit casing 4. However, the cellular phone device 1 can be operated by using both keyboard 19 and direction input device 20. Accordingly, the display unit 11 can be effectively used as a wide screen extending in the horizontal direction, so that a browser or the like can be used with the wide screen.

On the other hand, when the sliding casing 12 is caused to be in the key close state, the direction input device 20 is protected by the sliding casing 12, and the keyboard 19 is protected by the operation-unit casing 2.

It is possible to set the input function of the keyboard 19 to vary in accordance with the states of the display-unit casing 4 and the sliding casing 12 by the functions of the memory means and the selection means of the controller 33. Therefore, the keyboard 19 can be used effectively regardless of the state and the configuration of the cellular phone device 1.

The present invention is not limited to the foregoing embodiment, and various changes and modifications of the embodiment should be included in the scope of the invention. Hereinafter, modified examples will be explained, but the scope of the invention should not be limited to the modified examples. The electronic device of the following modified examples is same as the cellular phone device 1 of the foregoing embodiment, except the modified part.

FIRST MODIFIED EXAMPLE

Figure 11:
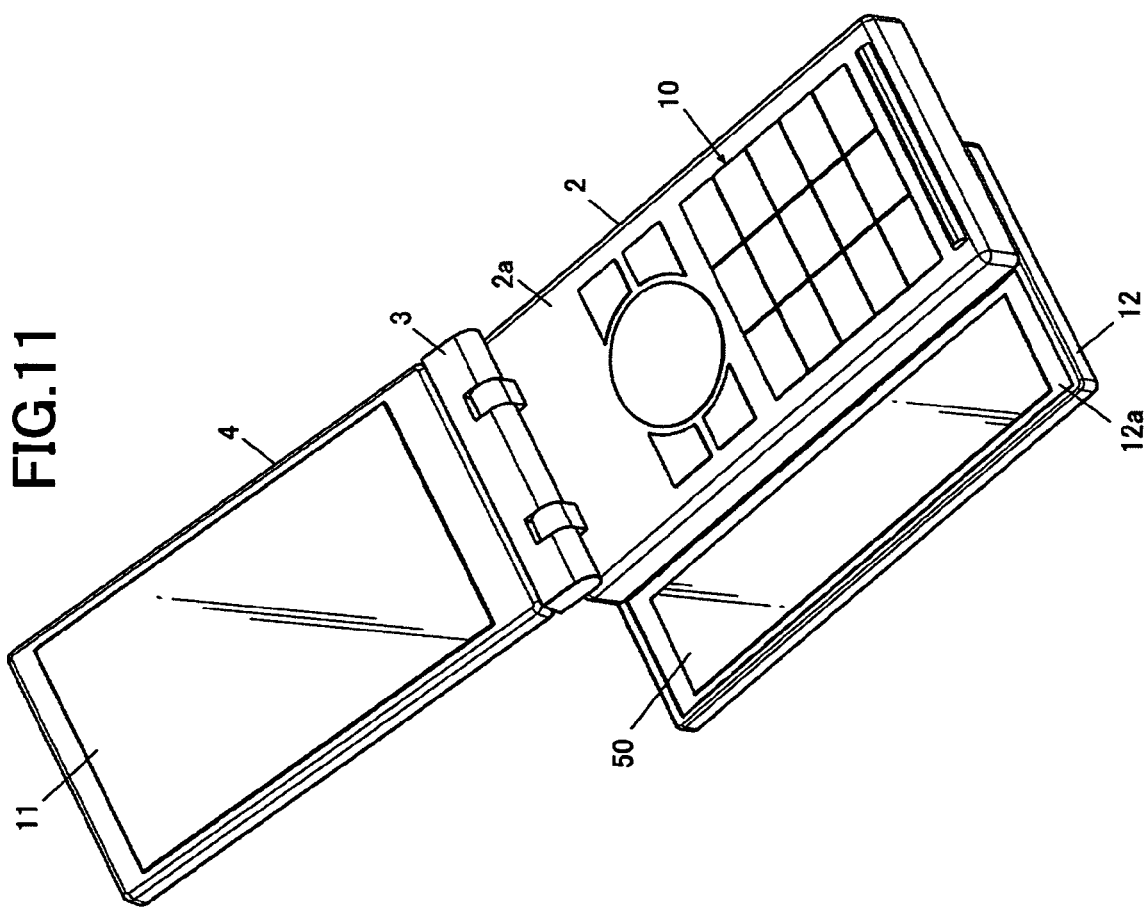
FIG. 11 is a perspective view showing the portable electronic device according to the embodiment of the invention, and is for explaining a touch panel provided on the front face of the sliding casing.

As shown in FIG. 11, a touch panel 50 for displaying and inputting may be provided on the front face 12a of the sliding casing 12 in lieu of the keyboard 19. The touch panel 50 has a display unit (e.g., a liquid crystal display panel, an EL display panel) and a transparent touch sensor (e.g., a matrix switch) put on the front face of the display unit. In this case, the touch sensor of the touch panel 50 corresponds to a first input unit. Note that a touch pad having an inputting function by touching may be placed in lieu of the touch panel 50 having the display unit and the input unit.

SECOND MODIFIED EXAMPLE

Figure 12:
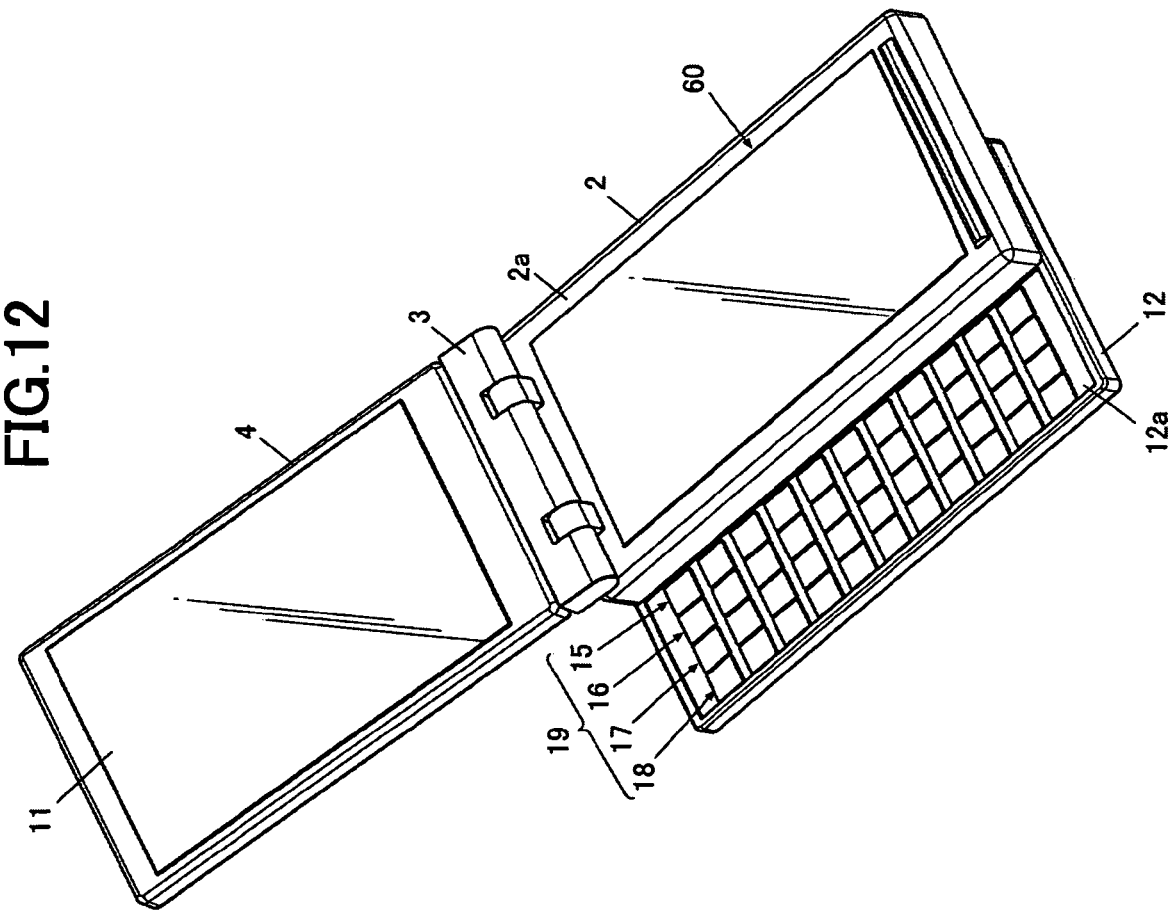
FIG. 12 is a perspective view showing the portable electronic device according to the embodiment of the invention, and is for explaining a touch panel provided on the front face of the operation-unit casing.

As shown in FIG. 12, a touch panel 60 for displaying and inputting may be provided on the front face 2a of the operation-unit casing 2 in lieu of the operation unit 10. The touch panel 60 has a display unit and a transparent touch sensor put on the front face of the display unit. In this case, the touch sensor of the touch panel 60 corresponds to an operation unit. With the direction input device 20 being exposed, the direction input device 20 can be used simultaneously with the touch panel 60 and the keyboard 19. Note that a touch pad having an inputting function by touching may be placed in lieu of the touch panel 60 having the display unit and the input unit, and may serve as a display unit for displaying.

THIRD MODIFIED EXAMPLE

Figure 13:
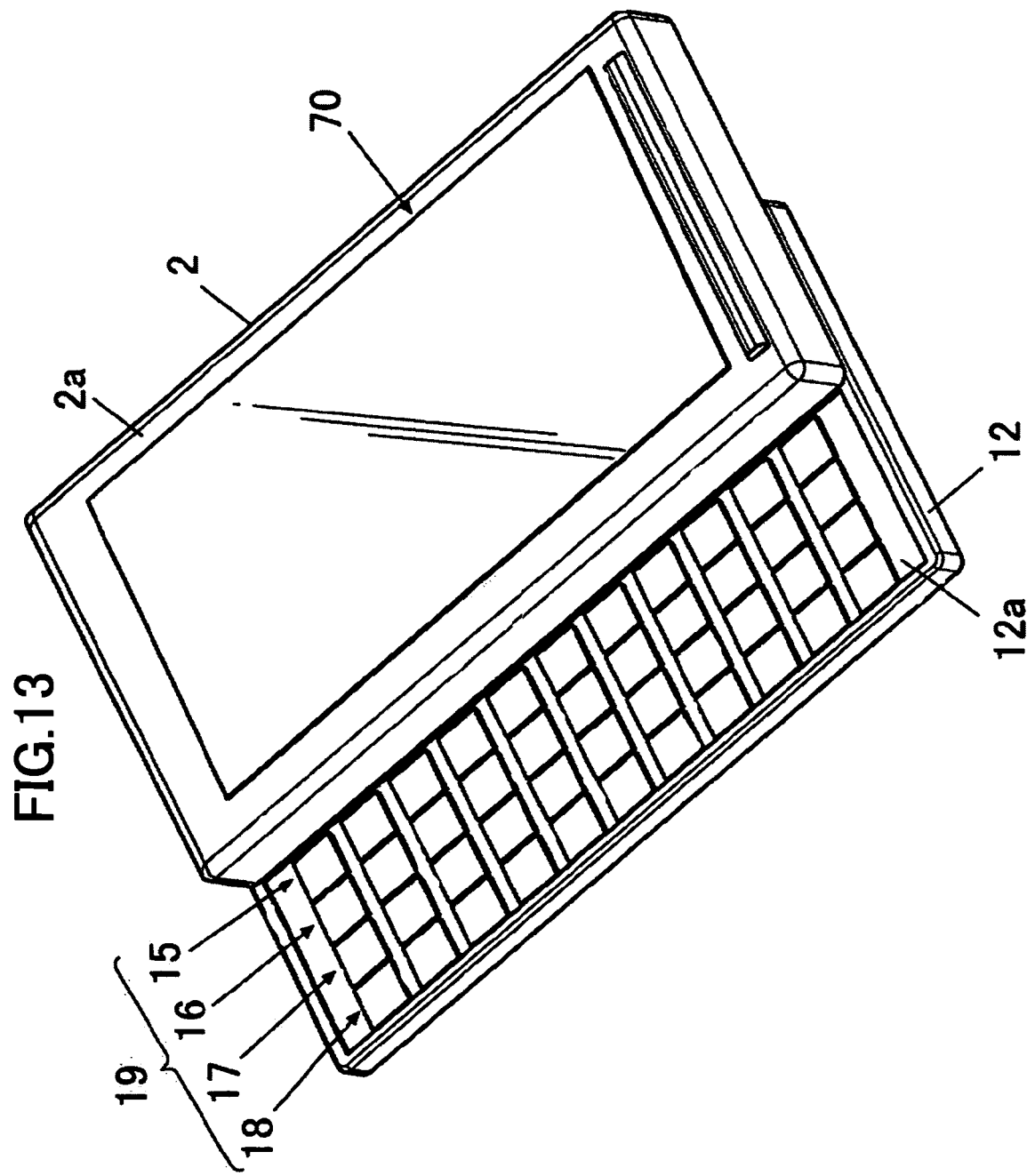
FIG. 13 is a perspective view showing the portable electronic device according to the embodiment of the invention, and is for explaining a structure where the display-unit casing is not coupled.

The display-unit casing 4 is hinged to the operation-unit casing 2 in the foregoing embodiment, the display-unit casing 4, however, may not be hinged. That is, as shown in FIG. 13, the cellular phone device 1 may not have the display-unit casing 4 and the biaxial hinge 3. In this case, as shown in FIG. 13, a touch panel 70 for displaying and inputting is provided on the front face 2a of the operation-unit casing 2 in lieu of the operation unit 10 provided on the front face 2a of the operation-unit casing 2. The touch panel 70 has a display unit and a transparent touch sensor put on the front face of the display unit. In this case, the touch sensor of the touch panel 70 corresponds to an operation unit. Note that a liquid crystal display panel, an EL display panel or the like may be provided on the front face 2a of the operation-unit casing 2 in lieu of the touch panel 70.

FOURTH MODIFIED EXAMPLE

According to the foregoing embodiment, a state where merely the key column 18 of the fourth column is exposed is set as the half-open state. Needless to say, a state where the key columns 17, 18 of the third and fourth columns are exposed may be set as the half-open state. Further, a state where merely the key columns 16 to 18 of the second to fourth columns are exposed may be set as the half-open state.

FIFTH MODIFIED EXAMPLE

Figure 14:
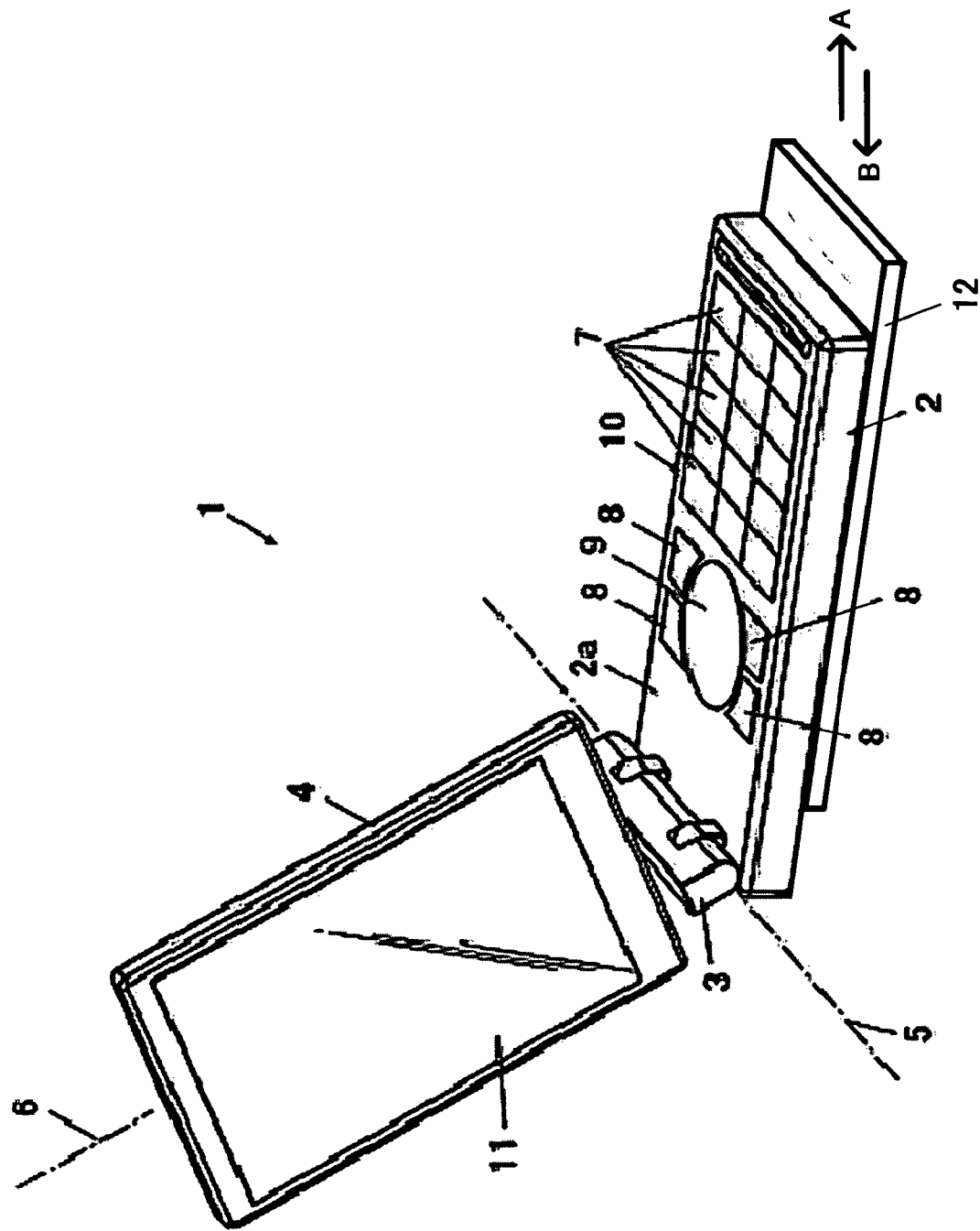
FIG. 14 is a perspective view showing the portable electronic device according to the embodiment of the invention with the sliding casing slid in the vertical direction.

It is structured in such a way that the sliding casing 12 slides in the horizontal direction in the foregoing embodiment. However, the sliding casing 12 may be slidable in the vertical direction. For example, as the sliding casing 12 slides in a direction of an arrow A indicated in FIG. 14, the sliding casing 12 opens with respect to the operation-unit casing 2. As the sliding casing 12 slides in a direction of an arrow B indicated in FIG. 14, the sliding casing 12 closes with respect to the operation-unit casing 2. The sliding range of the sliding casing 12 is from a state where the external contour of the operation-unit casing 2 overlaps the external contour of the sliding casing 12, as viewed from the front, and to a state where an upper side (a side toward the direction of the arrow B) of the sliding casing 12 overlaps the operation-unit casing 2, and the bottom side (a side toward the direction of the arrow A) of the sliding casing 12 is out from the external contour of the operation-unit casing 2. The position where the direction input device 20 is provided locates at the rear face of the operation-unit casing 2 and the upper part of the operation-unit casing 2. Therefore, as the sliding casing 12 slides in the direction of the arrow A, the direction input device 20 is exposed. As the sliding casing 12 slides in the direction of the arrow B, the direction input device 20 is hidden by the sliding casing 12. Note that a second input unit is not shown in FIG.

14. However, the second input device shown in, for example, FIGS. 5 to 8, and 11 may be disposed on the front face of the second casing.

SIXTH MODIFIED EXAMPLE

The operation-unit casing 2 is hinged to the display-unit casing 4 by the biaxial hinge 3 in the foregoing embodiment. The operation-unit casing 2 is, however, hinged to the display-unit casing 4 by an uniaxial hinge in lieu of the biaxial hinge 3. In this case, the axial line of the uniaxial hinge is the axial line 5 shown in FIG. 1. Further, in case of the uniaxial hinge, the cellular phone device 1 can be modified in such a way that the axial line 5 is parallel to the vertical direction of the operation-unit casing 2. In a case where the axial line 5 is parallel to the vertical direction of the operation-unit casing 2, the operation-unit casing 2 has a long side at the depthful side in FIG. 1 coupled to the uniaxial hinge, and the display-unit casing 4 has a long side coupled to the uniaxial hinge.

SEVENTH MODIFIED EXAMPLE

The axial line 5 of the biaxial hinge 3 is parallel to the horizontal direction of the operation-unit casing 2 in the foregoing embodiment. However, the axial line 5 of the biaxial hinge 3 may be parallel to the vertical direction of the operation-unit casing 2. In this case, the biaxial hinge 3 is not coupled to the short side of the operation-unit casing 2, but is coupled to the long side (located at the depthful side in FIG. 1) of the operation-unit casing 2. Further, the biaxial hinge 3 is not coupled to the short side of the display-unit casing 4, but is coupled to the long side of the display-unit casing 4.

EIGHTH MODIFIED EXAMPLE

In the foregoing embodiment, the explanation has been given of the example case where the portable electronic device is the cellular phone device 1. However, the invention can be applied to a personal computer, a digital camera, a PDA (Personal Digital Assistance), an electronic organizer, a portable wireless device, and other portable electronic devices.

NINTH MODIFIED EXAMPLE

The direction input device 20 functions as a first input unit in the foregoing embodiment. The first input unit may be one other than the direction input device 20 as long as it is for inputting to the controller 33. For example, a plurality of input keys, press buttons, a tactile switch or a dome switch may be provided on the rear face 2b of the operation-unit casing 2 in lieu of the direction input device 20. Input keys, press buttons, a tactile switch or a dome switch may be additionally provided on the rear face 2b of the operation-unit casing 2 around the direction input device 20. Allocations of the codes to the input keys, press buttons, tactile switch or the dome switch provided on the rear face 2b of the operation-unit casing 2 are not limited to any particular allocations.

TENTH MODIFIED EXAMPLE

The sliding casing 12 slides linearly in the foregoing embodiment. However, the sliding casing 12 may slide along a curved line. For example, a pivot orthogonal to the rear face 2b of the operation unit 2 is provided on the rear face 2b of the operation unit 2. The pivot is coupled to the front face 12a of the sliding casing 12. The sliding casing 12 rotates with respect to the operation-unit casing 2 around the pivot. Accordingly, the sliding casing 12 can slide along a curved line. The pivot can be provided at a corner of the rear face 2b of the operation-unit casing 2. For example, in a case where the pivot is provided at the bottom left side (a side toward the direction of the arrow A in FIG. 1) of the rear face 2b of the operation-unit casing 2, the sliding casing 12 can rotate counterclockwise. In a case where the pivot is provided at, for example, the bottom right side of the rear face 2b of the operation-unit casing 2, the sliding casing 12 can rotate clockwise.

ELEVENTH MODIFIED EXAMPLE

The sliding casing 12 slides in the horizontal or vertical direction in the foregoing embodiment. However, the sliding casing 12 may slide in an oblique direction. For example, if the sliding casing 12 slides in a downward left oblique direction from a state where the operation-unit casing 2 and the sliding casing 12 are overlapped with each other, the sliding casing 12 opens with respect to the operation-unit casing 2. Then, if the sliding casing 12 slides in an upward right oblique direction, the sliding casing 12 closes with respect to the operation-unit casing 2. In this case, the sliding range of the sliding casing 12 is between a state where the outer contour of the operation-unit casing 2 overlaps the outer contour of the sliding casing 12 as viewed from the front, and a state where the left side portion and the bottom portion of the sliding casing 12 are out from the right edge and the bottom edge of the operation-unit casing 2 in a downward left oblique direction as viewed from the front. In this case, the position where the direction input device 20 is provided is, for example, on the rear face 2b of the operation-unit casing 2 and is the upper right portion of the operation-unit casing 2. Accordingly, as the sliding casing 12 slides in the downward left oblique direction, the direction input device 20 is exposed. As the sliding casing 12 slides in the upward right oblique direction, the direction input device 20 is hidden by the sliding casing 12.

The present invention can be applied to a portable electronic device which requires multiple input units.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-108212 filed on Apr. 17, 2007 and including specification, claims, drawings and summary. The disclosure of the above Japanese Patent Application is incorporated herein by reference in its entirety.

What is claimed is:

1. An electronic device comprising:
    a first casing in which a first key operating unit having multiple keys is attached to a front surface of the first casing;
    a second casing in which a second key operating unit having multiple keys is attached to a front surface of the second casing, the front surface of the second casing being sliding coupled parallel to a rear surface of the first casing opposite the front surface of the first casing;
    a third casing connected to the first casing configured to open and close to expose or conceal the first key operating unit attached to the first casing, the third casing having a display configured to display information, irrespective of whether the third casing is in the open state or the closed state; and a control unit configured such that:
- in a first state in which the second casing slides relative to the first casing to expose the second key operating unit, the control unit is configured to detect the first state of the second casing being opened or closed relative to the first casing and allocates each key in the second key operating unit;
- in a second state in which the front surface of the first key operating unit of the first casing is concealed by the third casing being closed relative to the first casing, the control unit is configured to allocate each key of the second key operating unit to function as a key of a full keyboard; and
- in a third state in which the front surface of the first key operating unit of the first casing is exposed by the third casing being open relative to the first casing, the control unit is configured to allocate each key of the second key operating unit to function as an auxiliary key of the first key operating unit.

2. The electronic device according to claim 1, wherein the control unit, in a state in which the third casing is closed relative to the first casing to conceal the front surface of the first key operating unit, and in a state in which the second casing is slid midway relative to the first casing, and in a case in which the second key operating unit is exposed midway, the control unit a allocates each key to function as a side key.

* * * * *